Patented Sept. 22, 1936

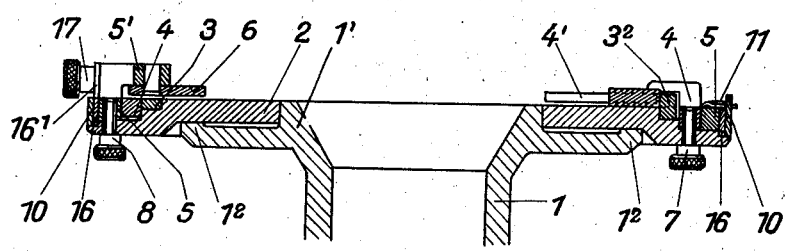

2,054,962

UNITED STATES PATENT OFFICE 2,054,962

GRIPPING DEVICE

Hugo Allemann, Bettlach, Switzerland

Application December 26, 1934, Serial No. 759,307
In Switzerland January 6, 1934

10 Claims. (Cl. 29—48)

This invention relates to a gripping device for simultaneously locally holding a plurality of work pieces.

In known devices of this class several guide plates recessed for receiving the work piece have to be secured to the table for each form of job. In working of pieces of different shapes all guide plates on the table must be changed, which involves quite a loss of time. Furthermore, the large number of guide plates needed means a considerable expense, as several of them are required for each form of work piece. In most instances, the guide plates are not changed, but a separate machine is provided for each form.

The invention proposes to simplify and improve the known devices so as to permit plate-like work pieces of any form to be instantly changed by adjusting stop rings without requiring the making of special tools for any form, and to make it possible to produce on the device according to the invention any mass articles, even in small quantities, by means of multiple working machines.

The invention attains its object by combining with a supporting plate for the work pieces a plurality of rings adjustable about the axis of the supporting plate and provided at their edges, in equal numbers and accurately and regularly divided, with stops acting as clamping jaws in such a way that by adjusting the rings, the stops will be set so that simultaneously at each working place and pieces of the same shape may be held in a definite position relative to the axis of the table.

By way of example, the invention is illustrated in the accompanying drawing, in which Figure 1 is a section on the line A—B—C, of Fig. 2; Fig. 2, a plan of the device; and Fig. 3 is a plan view of a segment of the device showing a slight modification.

Referring to the drawing, the machine frame 1 has on its upper end a hollow boss $1^1$ for rotatably guiding the plate 2 which is supported by an annular flange $1^2$ on the frame 1. The plate 2 has stepped reductions at its outer edge, and the inner top offset guides a ring 3 provided with four stops $3^1$ overlapping the plate 2 and each having a rim portion $3^2$. On the adjacent stepped portion another ring 4 is rotatably mounted which possesses four stops $4^1$ overlapping the plate 2 and which is supported by the ring 3. The ring 4 is surrounded by a ring 5 supported by the plate 2 and guided by the ring 4. The ring 5 has four arms provided with arms passing over the surfaces of the rings 4, 3 and the plate 2, and each arm carries a rocker or jaw 6. The rings 3, 4, and 5 are adjustable on the plate 2 relative to their common axis. While the ring 3 is fixed by the ring 4, the latter as well as the ring 3 are held in position by the clamping screws 7, 8 which pass through arcuate slots in the plate 2.

Four spring eyes 9 are attached to a rotary ring 10 which surrounds the rings 3, 4, 5 at the extreme edge step of the plate 2 and is fixed by a spring 11 which is secured to the ring 5 and, by means of the nose $10^1$, urges the ring 10 to turn anticlockwise under the action of the four springs 12. The springs 12 are attached to the eyes 9 and the rockers or jaws 6 and transmit their effect to the rockers or jaws 6 which are thus, with their hooklike ends forced against the work pieces 13. In this way the work pieces which rest against the stops $3^1$, $4^1$, and $3^2$ are held in position.

A curved cam 14 is arranged on the machine frame 1 so that the ends of the rockers or jaws 6 will engage the inner edge of the cam 14 when the plate 2 with the stop rings is rotated clockwise. The rockers or jaws 6 will thus be rotated anticlockwise and drawn away from the work pieces 13. Simultaneously, owing to the rotary motion of the plate 2 and the rings 3, 4, 5 and their stops, the released work piece slides along a crescent-shaped thin ejector 15 and out of its working position on the plate 2 towards the center thereof and drops down through the hollow boss $1^1$. The stops $3^1$ and $4^1$ as well as the rockers or jaws 6 are slightly spaced from the plate 2, so that the ejector 15 secured to the stationary boss $1^1$ can freely slip through between the plate 2 and the stops $3^1$, $4^1$ and the rockers or jaws 6 when the plate 2 is rotated.

Another adjustable ring 16, which is arranged between the rings 10 and 5 on the plate 2 and secured against rotation by a screw 17 screwed into the arm $5^1$ and passing through a slot of the ring 10, has four upwardly extending stops $16^1$ which limit the clockwise rotation of the rockers or jaws 6 owing to the pull of the springs 12 so that the rockers or jaws cannot get within working range of the tools.

When the device is to be adjusted to a different form of work piece, the laminated spring 11 is lifted out of the nose $10^1$ and the screws 7, 8, and 17 are loosened, so that all rings and the rockers or jaws 6 will be free. Then the ring 4 on the plate 2 is turned to the proper place and a work piece $13^1$ rests flatly against the stop $4^1$ and the rim portion $3^2$ of the ring 3, as indicated in a dotted line at D in Fig. 2. The ring 3 is rotated anticlockwise until the stop 3¹ rests against the work piece, whereupon the rings 3 and 4 are secured by the screw 7. The ring 5 is then adjusted so that the point of the rocker or jaw 6 strikes the work piece in such a way that the latter while resting against the stop 4¹ will engage the rim portion 3², whereupon the ring 5 is secured by means of the screw 8. Then the ring 16 is adjusted and secured by the screw 17 so that the stops 16¹ do not fully touch the rocker or jaw 6 at 6¹ when the point of the rocker or jaw contacts with the work piece. Finally, the four springs 12 are tensioned by turning the ring 10 clockwise until the spring 11 has engaged the nose 10¹ or snaps into position behind it. All four stops 3¹ and 4¹ as well as the rockers or jaws 6 will then be spaced properly and will hold the several work pieces of the same form.

Fig. 3 illustrates a modification of the device and shows how all the stops may be adjusted in their position relative to the ring axis to insure better adaptation to the forms of work pieces. By means of a pin 18 the stops 3¹ are secured to the ring 3 so as to be oscillatable about the pin and have extensions which are articulated to one another by an adjusting ring 19. If the ring 19 is rotated about its axis, all four stops 3¹ will cooperate to move angularly and will be adjusted thereby to suit the work piece. When the stops 3¹ are adjusted, the adjusting ring 19 is secured and held to the ring 3 by a clamping screw 20 which passes through a slot in the ring 19.

I claim:—

1. The combination with a rotary disk for supporting work pieces, of a series of rings mounted concentrically on the disk to oscillate relative thereto, a series of jaws carried by each ring, the jaws on a ring being movable simultaneously upon rotation of the ring, the jaws on one of said rings being movable toward and from the jaws on a second of said rings to grip opposite sides of a series of work pieces, and pivotal connections between a third ring and its jaws whereby the jaws carried by the third ring may swing toward and from the spaces between the jaws of the first mentioned rings to grip each work piece at a third point.

2. The combination with a rotary disk for supporting work pieces, of a series of rings mounted concentrically on the disk to oscillate relative thereto, a series of jaws carried by each ring, the jaws on a ring being movable simultaneously upon rotation of the ring, the jaws on one of said rings being movable toward and from the jaws on a second of said rings to grip opposite sides of a series of work pieces, pivotal connections between a third ring and its jaws whereby the jaws carried by the third ring may swing toward and from the spaces between the jaws of the first mentioned rings to grip each work piece at a third point, and means to swing the last jaws into and out of work piece gripping positions.

3. The combination with a rotary disk for supporting work pieces, of a series of rings mounted concentrically on the disk to oscillate relative thereto, a series of jaws carried by each ring, the jaws on a ring being movable simultaneously upon rotation of the ring, the jaws on one of said rings being movable toward and from the jaws on a second of said rings to grip opposite sides of a series of work pieces, pivotal connections between a third ring and its jaws whereby the jaws carried by the third ring may swing toward and from the spaces between the jaws of the first mentioned rings to grip each work piece at a third point, springs urging the last jaws into work piece engaging positions, and means to move the last jaws against the action of their springs as the disk is rotated.

4. The combination with a rotary disk for supporting work pieces, of a series of rings mounted concentrically on the disk to oscillate relative thereto, a series of jaws carried by each ring, the jaws on a ring being movable simultaneously upon rotation of the ring, the jaws on one of said rings being movable toward and from the jaws on a second of said rings to grip opposite sides of a series of work pieces, pivotal connections between a third ring and its jaws whereby the jaws carried by the third ring may swing toward and from the spaces between the jaws of the first mentioned rings to grip each work piece at a third point, arms on said last jaws extending outwardly of the disk, springs connecting the outer ends of said arms with the disk, and a cam member fixed in the path of the outer ends of said arms to be engaged by the arms in succession to move the last jaws away from the work pieces.

5. The combination with a rotary disk for supporting work pieces, a ring concentric of and mounted rotatably on said disk, work piece clamping jaws carried by said ring, a pair of rings concentric of and mounted oscillatably on said disk, work piece clamping jaws cooperating with the first jaws and each pivoted to both rings of said pair of rings whereby relative movement of one ring of the pair to the other will effect angular swinging of said pivoted jaws, a fourth ring concentric of and rotatably mounted on said disk and work piece clamping jaws pivotally carried by the fourth ring to swing into and out of work piece clamping position between the jaws of the first ring and the jaws of the pair of rings.

6. The combination with a rotary disk for supporting work pieces, a ring concentric of and mounted rotatably on said disk, work piece clamping jaws carried by said ring, a pair of rings concentric of and mounted oscillatably on said disk, work piece clamping jaws cooperating with the first jaws and each pivoted to both rings of said pair of rings whereby relative movement of one ring of the pair to the other will effect angular swinging of said pivoted jaws, a fourth ring concentric of and rotatably mounted on said disk, work piece clamping jaws pivotally carried by the fourth ring to swing into and out of work piece clamping position between the jaws of the first ring and the jaws of the pair of rings, and means to swing the last jaws into and out of work piece gripping positions.

7. The combination with a rotary disk for supporting work pieces, a ring concentric of and mounted rotatably on said disk, work piece clamping jaws carried by said ring, a pair of rings concentric of and mounted oscillatably on said disk, work piece clamping jaws cooperating with the first jaws and each pivoted to both rings of said pair of rings whereby relative movement of one ring of the pair to the other will effect angular swinging of said pivoted jaws, a fourth ring concentric of and rotatably mounted on said disk, work piece clamping jaws pivotally carried by the fourth ring to swing into and out of work piece clamping position between the jaws of the first ring and the jaws of the pair of rings, springs urging the last jaws into work piece engaging positions, and means to move the last jaws against the action of their springs as the disk is rotated.

8. The combination with a rotary disk for supporting work pieces, a ring concentric of and mounted rotatably on said disk, work piece clamping jaws carried by said ring, a pair of rings concentric of and mounted oscillatably on said disk, work piece clamping jaws cooperating with the first jaws and each pivoted to both rings of said pair of rings whereby relative movement of one ring of the pair to the other will effect angular swinging of said pivoted jaws, a fourth ring concentric of and rotatably mounted on said disk, work piece clamping jaws pivotally carried by the fourth ring to swing into and out of work piece clamping position between the jaws of the first ring and the jaws of the pair of rings, arms on said last jaws extending outwardly of the disk, springs connecting the outer ends of said arms with the disk, and a cam member fixed in the path of the outer ends of said arms to be engaged by the arms in succession to move the last jaws away from the work pieces.

9. The combination with a rotary disk for supporting work pieces, of a series of rings mounted concentrically on the disk to oscillate relative thereto, a series of jaws carried by each ring, the jaws on a ring being movable simultaneously upon rotation of the ring, the jaws on one of said rings being movable toward and from the jaws on a second of said rings to grip opposite sides of a series of work pieces, clamping screws passing through said rotary disk and engaging said jaw provided rings to secure them in desired positions on the disk, and pivotal connections between a third ring and its jaws whereby the jaws carried by the third ring may swing toward and from the spaces between the jaws of the first mentioned rings to grip each work piece at a third point.

10. The combination with a rotary disk for supporting work pieces, of a series of rings mounted concentrically on the disk to oscillate relative thereto, a series of jaws carried by each ring, the jaws on a ring being movable simultaneously upon rotation of the ring, the jaws on one of said rings being movable toward and from the jaws on a second of said rings to grip opposite sides of a series of work pieces, clamping screws passing through said rotary disk and engaging said jaw provided rings to secure them in desired positions on the disk, pivotal connections between a third ring and its jaws whereby the jaws carried by the third ring may swing toward and from the spaces between the jaws of the first mentioned rings to grip each work piece at a third point, and means to swing the last jaws into and out of work piece gripping positions.

HUGO ALLEMANN.